US009810897B2

(12) United States Patent
Owen

(10) Patent No.: US 9,810,897 B2
(45) Date of Patent: Nov. 7, 2017

(54) ENHANCED PERISCOPE

(75) Inventor: Gary Owen, Gwynedd (GB)

(73) Assignee: Kent Periscopes Limited, Denbirghshire (GB)

( * ) Notice: Subject to any disclaimer, the term of this patent is extended or adjusted under 35 U.S.C. 154(b) by 481 days.

(21) Appl. No.: 14/110,235

(22) PCT Filed: Apr. 4, 2012

(86) PCT No.: PCT/GB2012/050763
§ 371 (c)(1),
(2), (4) Date: Dec. 16, 2013

(87) PCT Pub. No.: WO2012/137003
PCT Pub. Date: Oct. 11, 2012

(65) Prior Publication Data
US 2014/0085716 A1    Mar. 27, 2014

(30) Foreign Application Priority Data

Apr. 8, 2011 (GB) .................................. 1105995.3

(51) Int. Cl.
G02B 23/08 (2006.01)
F41H 5/26 (2006.01)
(Continued)

(52) U.S. Cl.
CPC ............. G02B 23/08 (2013.01); F41H 5/266 (2013.01); G02B 23/10 (2013.01); G02B 26/0816 (2013.01)

(58) Field of Classification Search
CPC ........ G02B 23/00; G02B 23/02; G02B 23/06; G02B 23/08; G02B 23/10; G02B 23/12; F41H 5/266
(Continued)

(56) References Cited

U.S. PATENT DOCUMENTS 3,621,131 A * 11/1971 Wolff ..................... H04N 5/272
348/124
5,134,519 A * 7/1992 Abele ..................... G02B 23/08
359/402
(Continued)

FOREIGN PATENT DOCUMENTS

CA       2042419 A1 * 12/1991
DE       12 03 491       10/1965
(Continued)

OTHER PUBLICATIONS

International Search Report for corresponding patent application No. PCT/GB2012/050763 dated Jun. 5, 2012.

Primary Examiner — Darryl J Collins
Assistant Examiner — Journey Sumlar
(74) Attorney, Agent, or Firm — Renner, Otto, Boisselle & Sklar, LLP

(57) ABSTRACT

A periscope comprises an object window (4), a first reflector (5), a second reflector (6), a viewing window (7) and a display port for an electronic display (8). The first reflector (5) is arranged to reflect light from the object window (4) towards the second reflector (6). The second reflector (6) is selectively movable between a first position of use in which the second reflector (6) reflects light from the first reflector (5) towards the viewing window (7) and a second position of use in which the second reflector (6) reflects light from the display port towards the viewing window (7). The periscope provides a simple design that allows the user's view to be switched between an electronically generated image, such as night vision, and a purely optical image.

19 Claims, 3 Drawing Sheets

(51) Int. Cl.
*G02B 23/10* (2006.01)
*G02B 26/08* (2006.01)

(58) Field of Classification Search
USPC .................................................. 359/402–407
See application file for complete search history.

(56) References Cited

U.S. PATENT DOCUMENTS

2003/0184858 A1* 10/2003 Kung ................ G02B 26/0875
                                                      359/402
2011/0026090 A1* 2/2011 Minor et al. .................. 359/263

FOREIGN PATENT DOCUMENTS

GB        2 015 765       9/1979
JP        11 064739       3/1999

\* cited by examiner

ENHANCED PERISCOPE

This application is a national phase of International Application No. PCT/GB2012/050763 filed Apr. 4, 2012 and published in the English language.

This invention relates to a periscope.

BACKGROUND

Periscopes are used in a number of military applications to provide the occupants of a vehicle, such as a tank, with a view of the outside environment. In addition to the optical view from the periscope, such military vehicles are often also equipped with cameras that may provide digitally enhanced views of the outside environment, for example night vision or thermal imaging. It would be desirable to provide a periscope in which the user could switch between an external optical view and an electronically-generated view without changing the viewing position. Such a periscope is desirably relatively compact in order to allow retrofitting into existing vehicles without affecting the comfort or ease of exit of the user.

BRIEF SUMMARY OF THE DISCLOSURE

In accordance with the present invention there is provided a periscope comprising an object window, a first reflector, a second reflector, a viewing window and a display port for an electronic display. The first reflector is arranged to reflect light from the object window towards the second reflector. The second reflector is selectively movable between a first position of use in which the second reflector reflects light from the first reflector towards the viewing window and a second position of use in which the second reflector reflects light from the display port towards the viewing window.

Thus, according to embodiments of the invention, the user's view can be switched between an optical view through the object window and an electronically generated view from an electronic display, such as night vision or a thermal image, by simple movement of the second reflector.

The second reflector may be arranged for translational movement between the first and second positions of use. However, such an arrangement is likely to increase the size of the periscope and therefore reduce compactness. Thus, in the presently preferred embodiment, the second reflector is arranged to pivot between the first position of use and the second position of use. Pivoting tends to provide for a compact design of reflector.

The second reflector may be arranged to pivot about an axis that is outside the optical path between the first reflector and the viewing window (or the optical path between the display port and the viewing window). However, such an arrangement is not preferred for reasons of compactness. Thus, in embodiments of the invention, the second reflector is arranged to pivot about an axis which crosses the optical path between the first reflector and the viewing window (or the optical path between the display port and the viewing window). In this way, the movement of the second reflector can be achieved within a relatively compact footprint.

In embodiments of the invention, the second reflector is arranged to pivot through an angle of substantially 90 degrees between the first position of use and the second position of use. For example, the optical path from the first reflector and the optical path from the display port may approach the second reflector in opposite directions. Rotation through substantially 90 degrees allows the second reflector to reflect light from either of these optical paths towards the viewing window along an optical path at substantially at right angles to these directions.

The second reflector may be a prism or other suitable component with a reflective surface. In the preferred embodiment, however, the second reflector is a mirror.

The mirror may have a single reflective surface which is rotated to reflect light either from the first reflector or from the display port. In a preferred embodiment, however, the mirror has two opposed reflective surfaces. In this case, in the first position of use a first reflective surface of the mirror may reflect light from the first reflector towards the viewing window and in the second position of use a second reflective surface of the mirror may reflect light from the display port towards the viewing window. According to this arrangement, the double-sided mirror can be arranged so that in either position of use and during transition between the two positions, the mirror blocks light from the display port from entering the optical path to the object window. This can be advantageous in preventing illumination of the object window by the electronic display, which could give away the position of the periscope in a military scenario. Moreover, with this arrangement, the space required in the direction of the optical paths for the mirror to move between the two positions of use is minimised, as the mirror is not required to pass through a position in which its plane is parallel to the optical paths.

The second reflector may be biased into the first and/or second position of use by a spring mechanism. This is advantageous in providing positive positioning of the reflector and reducing the sensitivity of the reflector to vibration, for example when the periscope is mounted in a vehicle.

The periscope may comprise an adjustment mechanism for adjusting the angle of the second reflector relative to the viewing window in the first and/or second position of use. The adjustment mechanism allows the user to accommodate variations in height, seating position and eye position of the viewer.

The optical path between the display port and the second reflector may be substantially straight. However, this tends to increase the vertical extent of the periscope which may be undesirable in vehicles where space is limited. In a preferred embodiment, therefore, the optical path between the display port and the second reflector comprises a third reflector arranged to reflect light from the display port towards the second reflector, such that the optical path is not straight. In this way, the shape of the optical path can be adapted to match the space requirements of the location in which the periscope is to be installed.

In a particular embodiment of the invention, the optical path between the display port and the second reflector is substantially L-shaped. In this way, the vertical extent of the optical path can be limited by providing a horizontal portion of the optical path.

Typically, the third reflector may comprise a reflective surface at an acute angle to the optical path between the display port and the second reflector. The housing of the periscope may be configured to follow this reflective surface in order to provide additional space for the user.

The third reflector may be a mirror or other suitable reflective component. In the presently preferred embodiment the third reflector is a prism. In embodiments of the invention, the prism has the advantage of allowing a bend in the optics while shortening the air-equivalent optical path between the two major parts of the display optic, i.e. the part between the display port and the third reflector and the part between the second and third reflectors, thus enabling an overall display optic of higher magnification.

The periscope may comprise a plurality of lenses between the display port and the second reflector. The lenses can be configured to provide a clear image of the electronic display at the viewing window. For example, a concave lens, particularly a plano-concave lens, may be provided proximate the display port, in order to provide a relatively flat image of the electronic display. Similarly, a diffractive surface may be provided between the display port and the second reflector. The diffractive surface provides correction for chromatic aberration. The diffractive surface may be provided on the prism, but is preferably provided on a lens located between the prism (third reflector) and the second reflector in order that the light incident on the diffractive surface is as normal to the surface as possible. Thus, the diffractive surface may be located between the prism and the second reflector.

The periscope may comprise at least two spaced convex lenses between the display port and the second reflector. The convex lenses may be arranged in a Petzval configuration. In particular, the convex lenses may be spaced by the prism.

In use, the periscope comprises an electronic display device removably attached to the display port. In this way, the electronic components of the periscope may be provided in a cassette that can simply be replaced in the event of malfunction.

It should be understood that the object window and/or the viewing window may simply be apertures in the housing of the periscope and do not necessarily include transparent material, such as glass or plastics. Moreover, the object window may be provided by the face of a prism, which forms the first reflector.

BRIEF DESCRIPTION OF THE DRAWINGS

Embodiments of the invention are further described hereinafter with reference to the accompanying drawings, in which.

DETAILED DESCRIPTION

Figure 1:
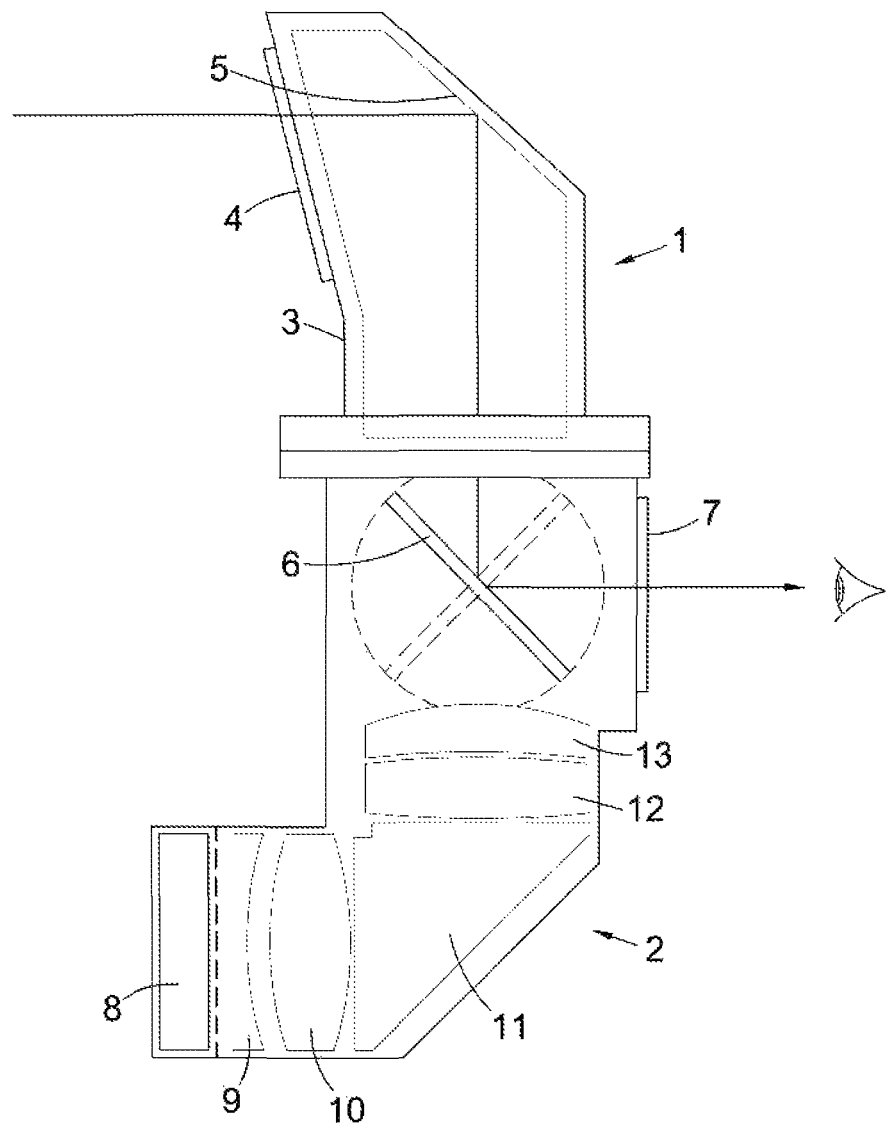
FIG. 1 is a sectional view of a periscope according to an embodiment of the invention.

FIG. 1 is a sectional view of a periscope according to an embodiment of the invention. The periscope comprises an upper section 1 connected to a lower section 2. The upper section 1 comprises a housing 3 provided with a transparent window 4. Within the upper section 1, a mirrored surface 5 at an acute angle to the plane of the window 4 reflects light from the window 4 into the lower section 2.

Figure 2:
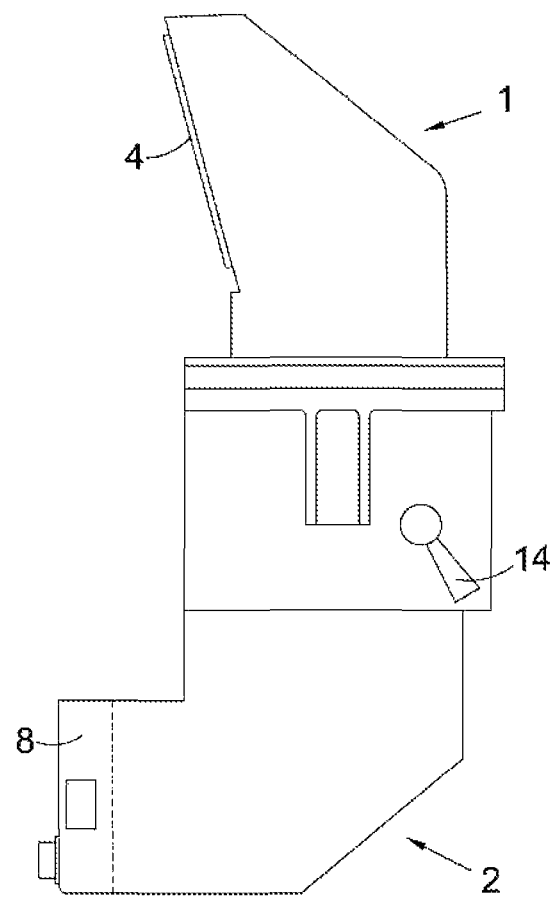
FIG. 2 is a side view of the periscope of FIG. 1.
Figure 3:
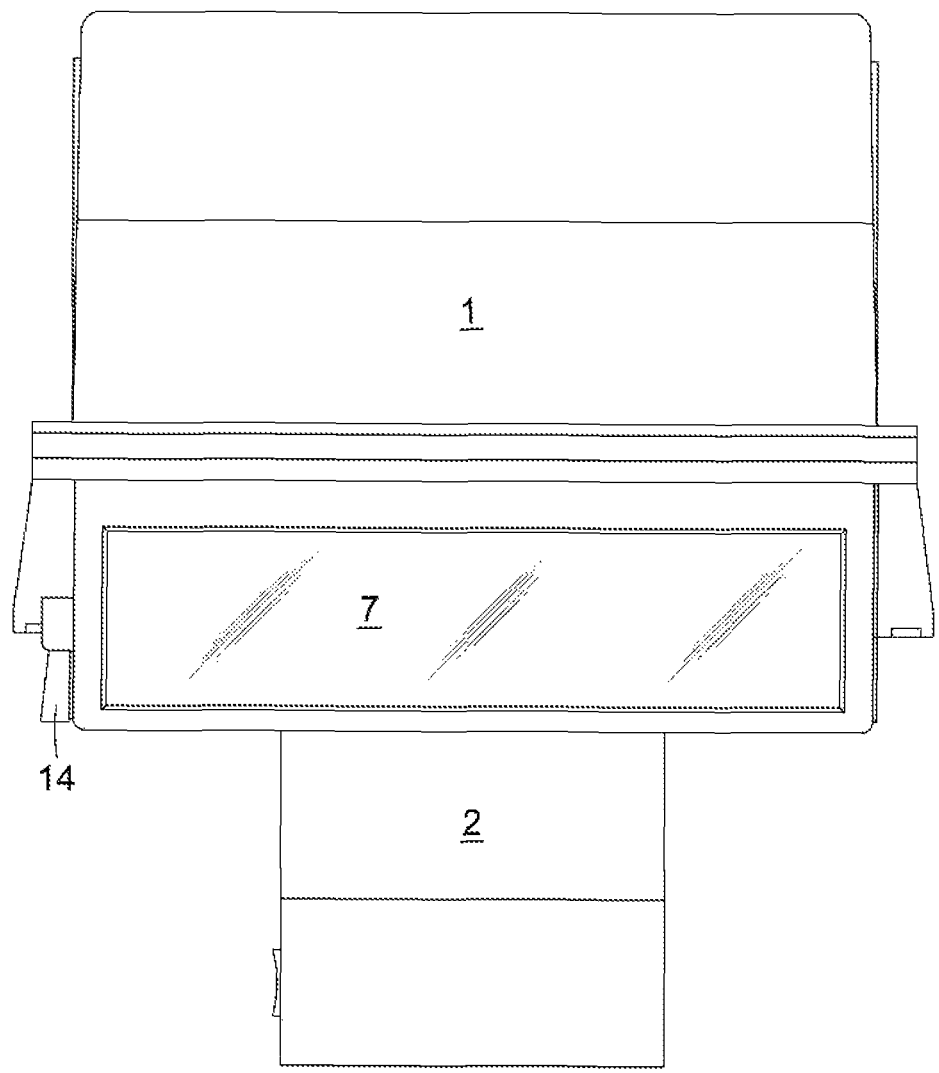
FIG. 3 is a front view of the periscope of FIGS. 1 and 2.

The lower section 2 comprises a rotatable mirror 6 which is mounted for rotation within the housing of the lower section 2. The rotatable mirror 6 is mirrored on each of its major surfaces and is biased by a spring mechanism into two stable positions, represented in solid and phantom lines in FIG. 1. In the first stable position of the rotatable mirror 6, shown in solid lines in FIG. 1, light from the upper section 1 of the periscope is reflected by the mirror 6 through a viewing window 7 towards the user. In the second stable position of the mirror 6, shown in phantom lines in FIG. 1, light from the lower section 2 of the periscope is reflected by the mirror 6 through the viewing window 7. The position of the rotatable mirror 6 is selected by actuating a lever 14, shown in FIG. 2, which toggles the mirror 6 between the first and second stable positions.

The lower section 2 further comprises an optical train for directing light from a cassette module 8 comprising an electronic display, such as a VGA display, to the rotatable mirror 6 for reflection to the user. The cassette module 8 is removably mounted to the lower section 2 of the periscope for easy replacement. This ensures that the principal electronic components of the periscope can simply be replaced in the event of a malfunction. The connection between the cassette module 8 and the lower section 2 of the periscope includes asymmetrically arranged mating formations, such as pegs and sockets, to ensure that the cassette module 8 and hence the display is located in the correct orientation on the lower section 2. The VGA display is configured to show electronically generated digital images, such as night vision images, from outside the vehicle in which the periscope is mounted. Other electronically generated images may be displayed. The image from the VGA display is typically black and white and it is therefore important that chromatic aberration by the optical train does not blur the image. The VGA display is activated by a microswitch when the lever 14 moves the rotatable mirror 6 to the second stable position and deactivated when the lever 14 moves the rotatable mirror 6 back to the first stable position.

The optical train comprises a first concave glass lens 9, in this case a plano-concave lens, proximate the VGA display, which is provided to ensure that the image of the VGA display is relatively flat when viewed by the user through the viewing window 7. A second plastic aspheric lens 10 is provided after the first lens 9 in the optical train to direct light from the first lens 9 into a glass prism 11. The prism 11 reflects the light from the second lens 9 towards the rotatable mirror 6 and also provides a spacing in the optical train which corrects for astigmatism in the image of the VGA display at the viewing window 7. The reflected light from the prism 11 passes through a third aspheric plastic lens 12 which is provided with an upper diffractive surface that corrects for chromatic aberration of the image of the VGA display. The light from the third lens 12 passes through a fourth glass lens 13, in this case a meniscus lens, which forms the image of the VGA display that is reflected by the rotatable mirror 6 for viewing by the user through the viewing window 7. The image of the VGA display is focused at around arm's length for the user.

The axis of rotation of the rotating mirror 6 is substantially perpendicular to the optical axis of the optical train. It will be seen from FIG. 1 that in rotating from the first stable position to the second stable position and back, the rotating mirror 6 always blocks the optical path between the upper section 1 and the lower section 2. In this way, the mirror 6 always prevents light from the VGA display 8 escaping through the transparent window 4. This is important for military operations, particularly at night, where there is a risk that any escaping light could give away the position of the periscope and hence the user.

Furthermore, as shown in FIG. 1, the rotating mirror 6 only rotates through approximately 90 degrees between the first stable position and the second stable position. Because the mirror 6 is not required to rotate through a full 360 degrees, the vertical space occupied by the mirror is less than the width of the mirror 6, which allows the periscope to be relatively short in the vertical direction and of minimal depth in the horizontal direction.

The provision of the prism 11 in the optical train between the VGA display and the rotatable mirror 6 provides an L-shaped optical path. In this way, the extent of the periscope in the vertical direction is reduced compared to a straight optical path. Moreover, the housing of the lower section 2 of the periscope follows the angled reflective surface of the prism 11, which provides additional clearance for the user.

In summary, a periscope comprises an object window 4, a first reflector 5, a second reflector 6, a viewing window 7 and a display port for an electronic display 8. The first reflector 5 is arranged to reflect light from the object window 4 towards the second reflector 6. The second reflector 6 is selectively movable between a first position of use in which the second reflector 6 reflects light from the first reflector 5 towards the viewing window 7 and a second position of use in which the second reflector 6 reflects light from the display port towards the viewing window 7. The periscope provides a simple design that allows the user's view to be switched between an electronically generated image, such as night vision, and a purely optical image.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A periscope comprising:
   an object window;
   a first reflector;
   a second reflector;
   a viewing window; and
   a display port for an electronic display,
   wherein the first reflector is arranged to reflect light from the object window towards the second reflector in both a first position of use and a second position of use; and
   the second reflector is a mirror; and
   the mirror has two opposed reflective surfaces; and
   the second reflector is selectively movable between the first position of use in which the second reflector reflects light from the first reflector towards the viewing window and the second position of use in which the second reflector reflects light from the display port towards the viewing window.

2. A periscope as claimed in claim 1, wherein the second reflector is arranged to pivot between the first position of use and the second position of use.

3. A periscope as claimed in claim 2, wherein the second reflector is arranged to pivot about an axis which crosses the optical path between the first reflector and the viewing window.

4. A periscope as claimed in claim 2, wherein the second reflector is arranged to pivot through an angle of substantially 90 degrees between the first position of use and the second position of use.

5. A periscope as claimed in claim 1, wherein in the first position of use a first reflective surface of the mirror reflects light from the first reflector towards the viewing window and in the second position of use a second reflective surface of the mirror reflects light from the display port towards the viewing window.

6. A periscope as claimed in claim 1, wherein the second reflector is biased into the first and/or second position of use by a spring mechanism.

7. A periscope as claimed in claim 1, wherein the optical path between the display port and the second reflector comprises a third reflector arranged to reflect light from the display port towards the second reflector, such that the optical path is not straight.

8. A periscope as claimed in claim 7, wherein the optical path between the display port and the second reflector is substantially L-shaped.

9. A periscope as claimed in claim 7, wherein the third reflector is a prism.

10. A periscope as claimed in claim 1, comprising a plurality of lenses between the display port and the second reflector.

11. A periscope as claimed in claim 10 comprising a concave lens proximate the display port.

12. A periscope as claimed in claim 10 comprising a diffractive surface between the display port and the second reflector.

13. A periscope as claimed in claim 12 wherein the diffractive surface is located between the prism and the second reflector.

14. A periscope as claimed in claim 10 comprising at least two spaced convex lenses between the display port and the second reflector.

15. A periscope as claimed in claim 14, wherein the optical path between the display port and the second reflector comprises a third reflector arranged to reflect light from the display port towards the second reflector, such that the optical path is not straight, wherein the third reflector is a prism, and wherein the prism is interposed between the convex lenses.

16. A periscope as claimed in claim 1, comprising an electronic display device removably attached to the display port.

17. A periscope as claimed in claim 1, wherein the object window and the display port face in a common direction.

18. A periscope as claimed in claim 1, wherein when the second reflector is in the first position of use, the light from the object window is reflected a total of n times between the object window and the viewing window; and
   wherein when the second reflector is in the second position of use, the light from the display port is reflected a total of n times between the display port and the viewing window.

19. A periscope as claimed in claim 1, wherein the viewing window receives incoming light along an optical axis; and
   wherein the object window and the display port are laterally spaced apart in opposite directions from the optical axis.

* * * * *